(No Model.)
H. C. A. KASSCHAU.
FISHING REEL.
No. 365,602. Patented June 28, 1887.
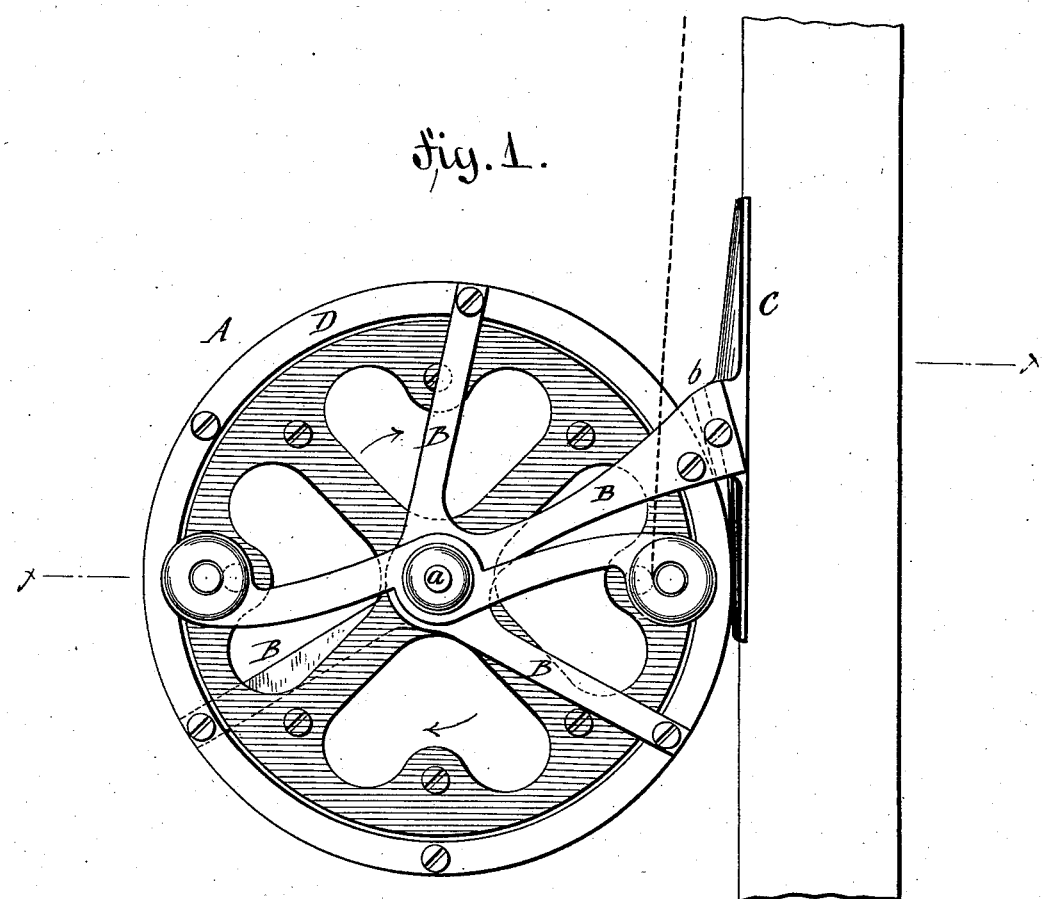
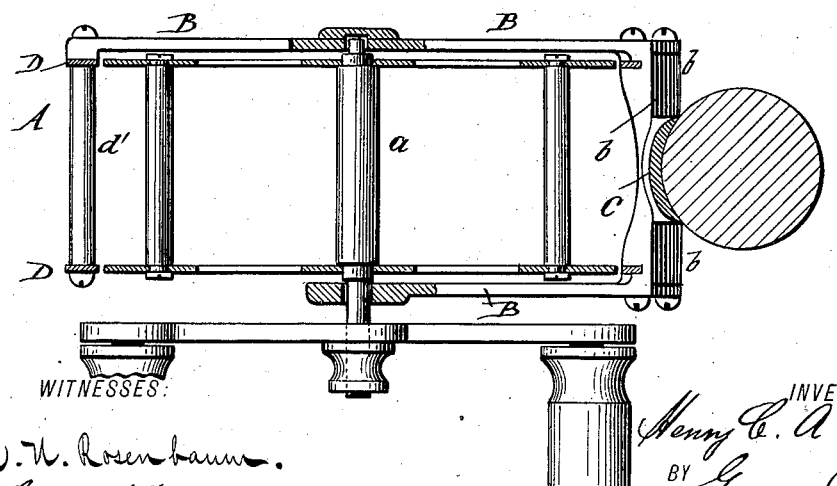

UNITED STATES PATENT OFFICE.

HENRY C. A. KASSCHAU, OF NEW YORK, N. Y.

FISHING-REEL.

SPECIFICATION forming part of Letters Patent No. 365,602, dated June 28, 1887.

Application filed March 31, 1887. Serial No. 233,129. (No model.)

*To all whom it may concern:*

Be it known that I, HENRY C. A. KASSCHAU, of the city, county, and State of New York, have invented certain new and useful Improvements in Fishing-Reels, of which the following is a specification.

This invention relates to an improved reel for fishing-rods, whereby the entangling of the line with the reel-shaft and its supporting-bracket frame is prevented and the reel secured in such relative position to the rod that a greater resistance is exerted to strains exerted on the line; and the invention consists of a fishing-reel, the axle of which is supported in bearings of a bracket-frame attached to the reel, the reel being surrounded by ring-shaped guard-frames, which are concentric to the side frames of the reel and connected by transverse stays. The supporting-bracket of the reel is attached, at a suitable inclination to the axis of the rod away from the direction of strain, to an inclined cheek of the base or shoe by which the reel-frame is attached to the rod, whereby the same is capable to resist in a greater measure the strains exerted on the line.

In the accompanying drawings, Figure 1 represents a side elevation of my improved fishing-reel. Fig. 2 is a horizontal section of the same on line *x x*, Fig. 1.

Similar letters of reference indicate corresponding parts.

In the drawings, A represents a fishing-reel of the usual construction, the axle *a* of which is supported in bearings of a bracket-frame, B, that is attached to an inclined cheek, *b*, of the base or shoe C, by which the supporting-frame of the reel is attached to the fishing-rod in the usual manner. The axle of the reel A is provided with a fixed crank-lever, and handles at one or both ends of the same, as customary in fishing-reels.

To the supporting-brackets B are attached, by means of screws and transverse stays *d'*, ring-shaped guard-frames D, which encircle the reel, and are arranged in line with the side frames of the same, as shown clearly in Fig. 2. The ring-shaped guard-frames D serve to prevent the entangling of the line by winding the same on the axle between the reel and supporting-brackets, which is an annoying feature of many fishing-reels heretofore in use. The ring-shaped guard-frames D guide the line on the reel, so that the same is wound up without any possibility of passing off the reel and getting out of order. The supporting-bracket frames B B are attached at one side by three arms to the ring-shaped guard-frame D, and at the other side of the reel by four arms to the same, whereby the rigid position of said guard-frames is secured. The line passes onto the reel close to the rod, instead of passing on the reel at the outer side of the same, whereby the line is more easily guided onto the reel. As the supporting-bracket frames B B are attached to the inclined cheek of the base or shoe C, they are supported at an angle of about sixty degrees to the axis of the rod away from the direction of the strain, as shown in Fig. 1. By this position of the bracket-frame the reel and line are brought close to the fishing-rod, while the reel is supported in such a manner that it can offer greater resistance to the strains exerted thereon by the line, especially when a fish of large size has been caught on the hook, than when the reel is supported sidewise of the rod, with its axis at right angles thereto, in which position the reel is less liable to resist strains on the reel, so that it may be pressed toward the rod and prevented from being operated. This is entirely obviated by the downwardly-inclined position of the bracket-frames, which support the reel in a position closer to the rod, but in such a manner as to be better adapted to resist heavy strains on the line.

Having thus described my invention, I claim as new and desire to secure by Letters Patent—

1. The combination, with a base or shoe having inclined cheeks, of bracket-frames attached to said cheeks at a downward angle of inclination to the axis of the rod, and a reel supported in bearings of said bracket-frames close to the rod, substantially as set forth.

2. The combination, with a base or shoe having inclined cheeks, of bracket-frames attached to said cheeks at a downward angle of inclination to the rod, ring-shaped guard-frames supported by said bracket-frames, and a reel supported in bearings of the bracket-frames close to the rod, substantially as set forth.

In testimony that I claim the foregoing as my invention I have signed my name in presence of two subscribing witnesses.

HENRY C. A. KASSCHAU.

Witnesses:
CARL KARP,
MARTIN PETRY.